July 2, 1968            G. L. NEELY            3,390,774

SPIN-ON TYPE FILTER WITH DUAL VALVE AND DUAL FILTER MEDIA

Filed Aug. 28, 1967            6 Sheets-Sheet 1

INVENTOR
GEORGE L. NEELY
BY
ATTORNEYS

INVENTOR
GEORGE L. NEELY
BY
ATTORNEYS

July 2, 1968  G. L. NEELY  3,390,774
SPIN-ON TYPE FILTER WITH DUAL VALVE AND DUAL FILTER MEDIA
Filed Aug. 28, 1967  6 Sheets-Sheet 4

INVENTOR
GEORGE L. NEELY
BY
ATTORNEYS

INVENTOR
GEORGE L. NEELY
BY [signatures]
ATTORNEYS

July 2, 1968 G. L. NEELY 3,390,774
SPIN-ON TYPE FILTER WITH DUAL VALVE AND DUAL FILTER MEDIA
Filed Aug. 28, 1967 6 Sheets-Sheet 6

INVENTOR
GEORGE L. NEELY
BY
ATTORNEYS

United States Patent Office 3,390,774
Patented July 2, 1968

3,390,774
SPIN-ON TYPE FILTER WITH DUAL VALVE
AND DUAL FILTER MEDIA
George Leonard Neely, Berkeley, Calif., assignor to
Chevron Research Company, San Francisco, Calif.,
a corporation of Delaware
Continuation-in-part of application Ser. No. 575,690,
Aug. 29, 1966. This application Aug. 28, 1967, Ser.
No. 667,036
11 Claims. (Cl. 210—132)

ABSTRACT OF THE DISCLOSURE

A spin-on type full-flow engine oil filter unit using a two-valve assembly at one end of the housing to control flow and bypass of oil through a fine, primary medium and a coarse auxiliary filter medium of extended length. When the pressure drop across the primary filter exceeds a selected value, one of the two valves opens the direct flow through the coarse filter. One or two coextensive springs, and the relative areas of the two valve areas control the bypass pressures to open the valves.

Cross references

This application is a continuation-in-part of my patent application Ser. No. 575,690, filed Aug. 29, 1966, and now abandoned.

The present invention relates to automobile engine lubricating oil filters. More particularly, it relates to engine oil filter units of the spin-on type wherein the filter unit and the casing are formed as a single commercial unit for connection into the automobile engine lubricating oil supply system for full flow filtering.

It is a particular object of the present invention to provide simplified construction of a spin-on type lubricating oil filtering unit that is an improvement over the dual filtering media, dual-valve control unit disclosed in my copending patent application Ser. No. 446,479, filed Apr. 1, 1965, now U.S. Patent 3,269,541. In accordance with the present invention, a simplified dual valve arrangement is positioned for controlling flow to the dual filter media. A cylindrical shell is located between the dual filter elements to provide passageways for selective flow of oil from the inlet cup member of the filter unit through the dual filter element and then to the discharge inlet. The simplified construction and assembly of these parts gives (1) greater oil filtering capacity through the auxiliary coarse filter element, (2) requires fewer parts for assembly within the center space of a conventional spin-on type lubricating oil filter, and (3) simplifies construction of the improved dual filter valves.

In current model automobiles the aerodynamic shape of the body and the demand for high horsepower engines have greatly reduced available space in the engine compartment for lubricating oil filters. The problem is further aggravated by the present demand for space under the hood to house power steering units, power brakes, and air conditioners. Further, automobile manufacturers now recommend extended drain intervals for changing oil that frequently overtax the ability of the lubricating oil, even when heavily compounded with dispersing agents. Each of these conditions seriously limit the life and capacity of the so-called "full flow" spin-on type filters now in current use. Accordingly, efficient use of all of the volume available in a standard-sized spin-on type filter of the type now used on many models of automobiles is highly desirable. The present arrangement, a further improvement on the arrangement shown in my patent, takes maximum advantage of the limited space available in such a standard volume unit.

In accordance with the preferred embodiment of my invention, a single impervious cylindrical shell element radially spaced inwardly from the outer, or fine, filter element isolates the flow channel of the filtered oil coming through the fine filter element from the unfiltered oil supplied to the coarse filter element.

In accordance with a preferred embodiment, the cylindrical shell is sealed at the closed end of the cup member of the spin-on filter unit to the end plate support for the outer filter. This forms a passageway running almost the length of the fine filter element between the closed end of the cup member and a dual valve arrangement at the open end of the improved filter unit. The dual valve arrangement is positioned at the "open" end of the cup member and includes a primary, or main, bypass valve arranged to operate when a first predetermined pressure differential exists between oil in the cup member and the discharge connection and an auxiliary bypass valve arranged to operate when a second—and lower—pre-determined pressure differential exists between oil in the aforementioned locations. The auxiliary valve element controls flow through the coarse, annular filter body on the discharge side of the coarse filter element. Both valves are biased to closed positions by either one or two coextensive springs positioned at one end of the coarse filter element. The spring force constants and the relative areas of the two valve areas control the biasing pressures to open the valves.

In another embodiment both primary and auxiliary valves are positioned at closed end of the cup member so that the auxiliary valve operates on the inlet side of the coarse filter element. Both valves are again biased by one or two springs adapted to be positioned at the closed end of the cup in axial alignment with the coarse filter element.

In both embodiments, the auxiliary valve, in accordance with the teachings of my earlier filed patent application, is set to operate at a pressure that is less than the bypass pressure required to operate the main bypass valve.

Further objects and advantages of the present invention will become apparent from the following detailed description taken in conjunction with the accompanying drawings which form an integral part of the present specification.

Figure 4:
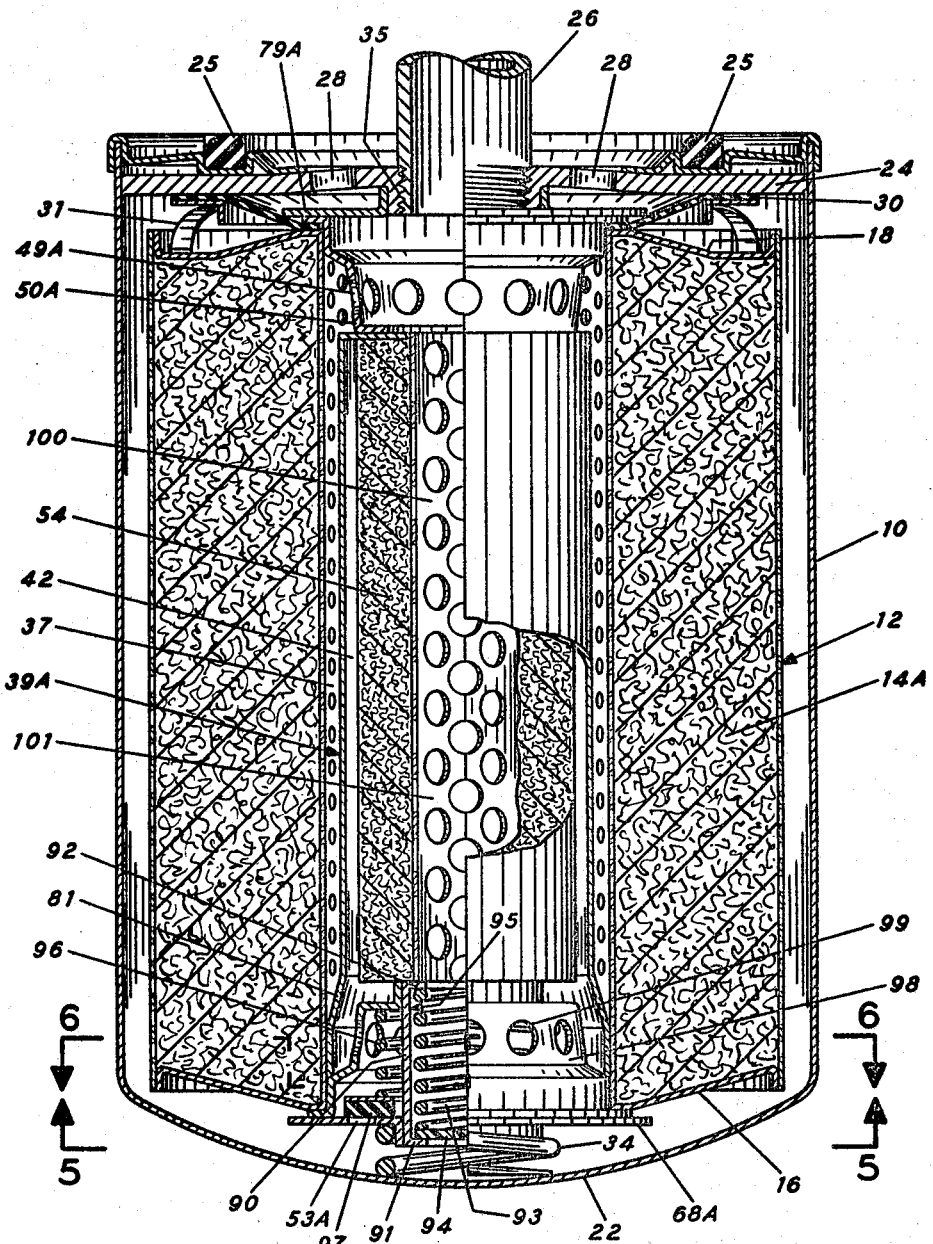
FIGURE 4 is a vertical plan view, partially in section, illustrating the internal construction of an alternate form of the present invention.
Figure 6:
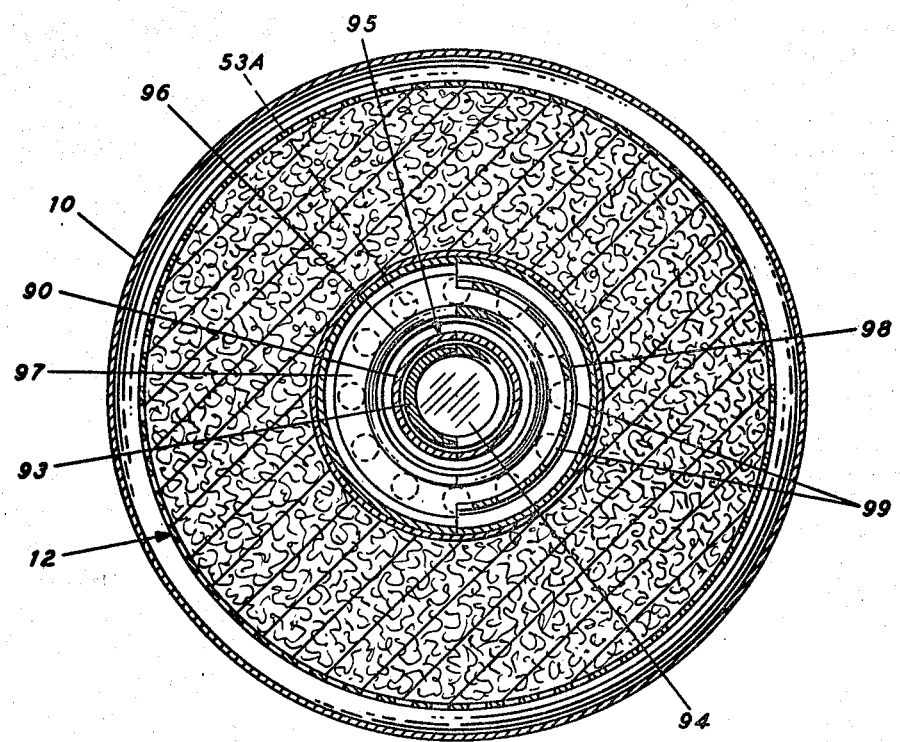
Figure 5:
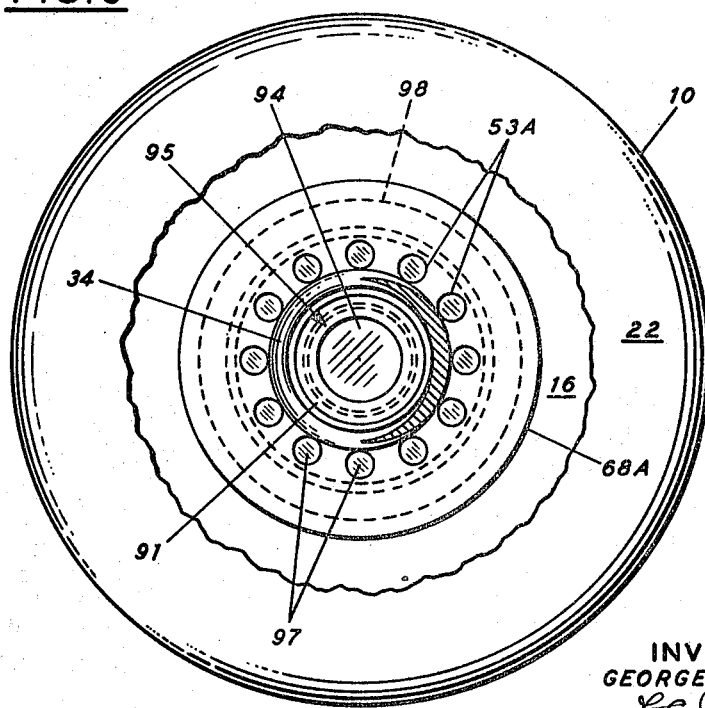

FIGURES 5 and 6 are cross-sectional plan view taken in the direction of lines 5—5 and 6—6, respectively, of FIGURE 4.

Figure 7:
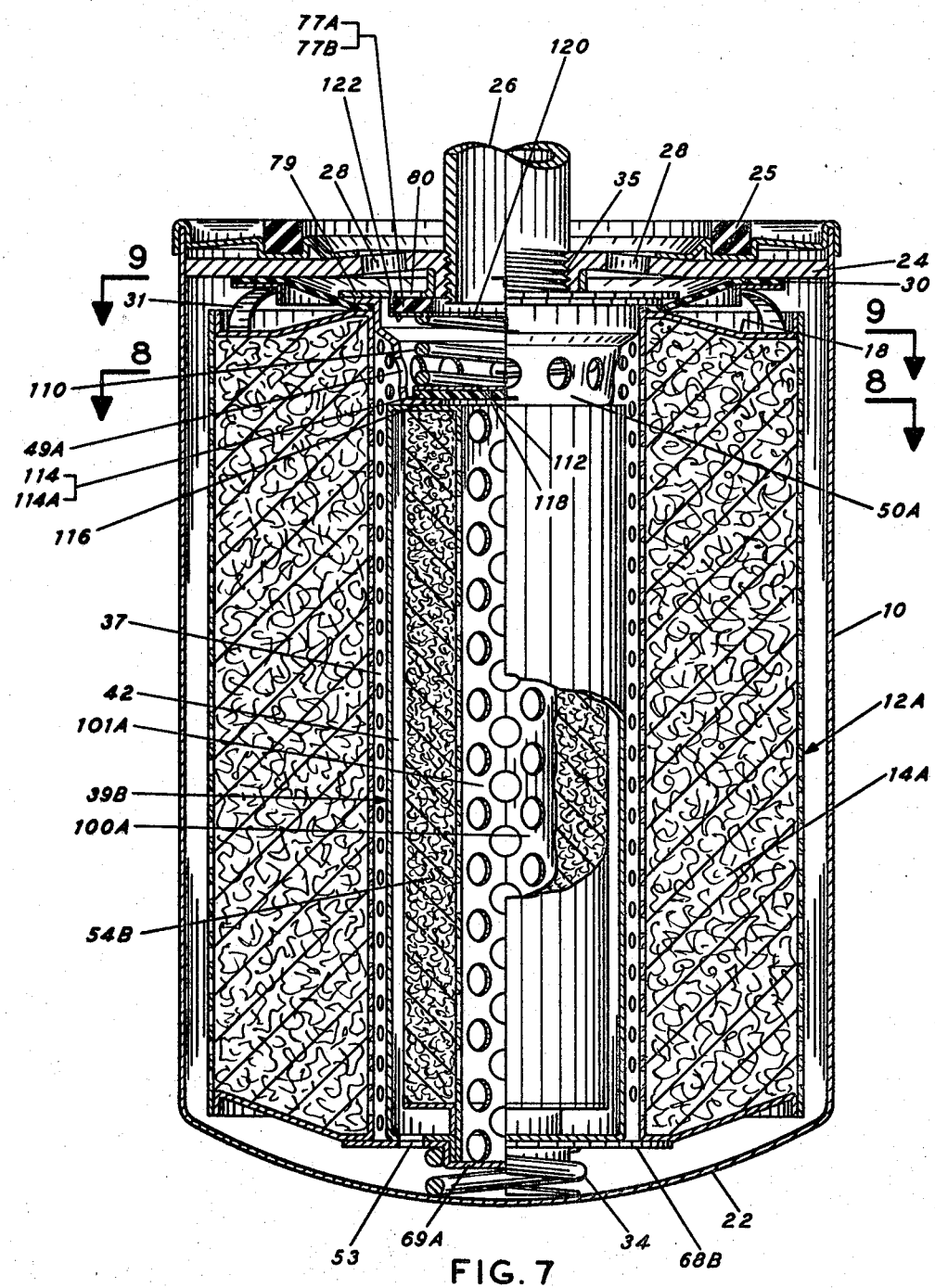

FIGURE 7 is a vertical plan view, partially in section, illustrating the internal construction of another embodiment of the valve assembly according to the present invention.

Figure 8:
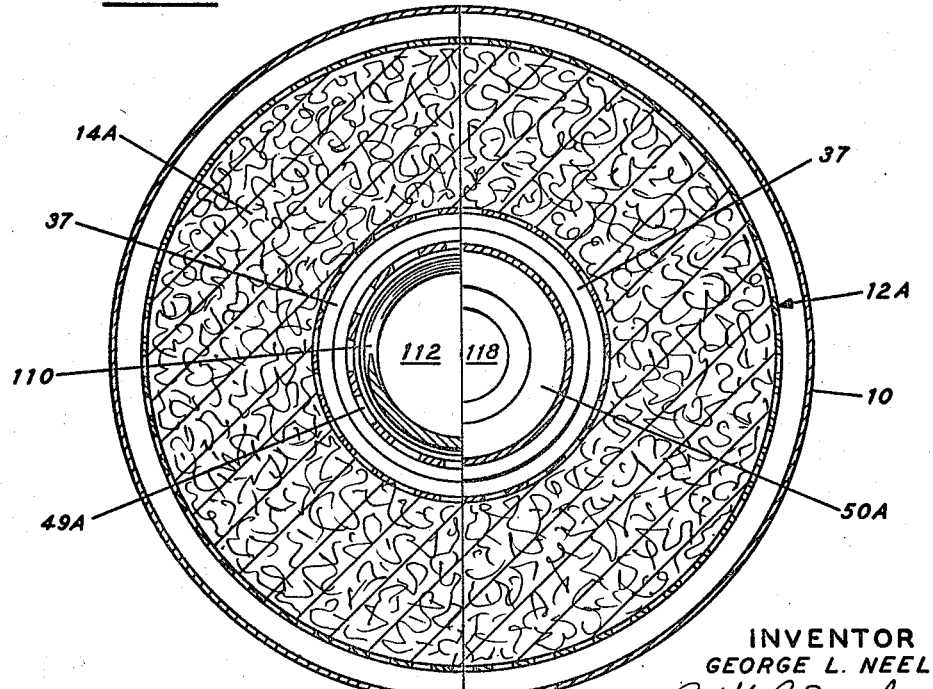

FIGURE 8 is a cross-sectional plan view, taken in the direction of line 8—8 in FIGURE 7.

Figure 9:
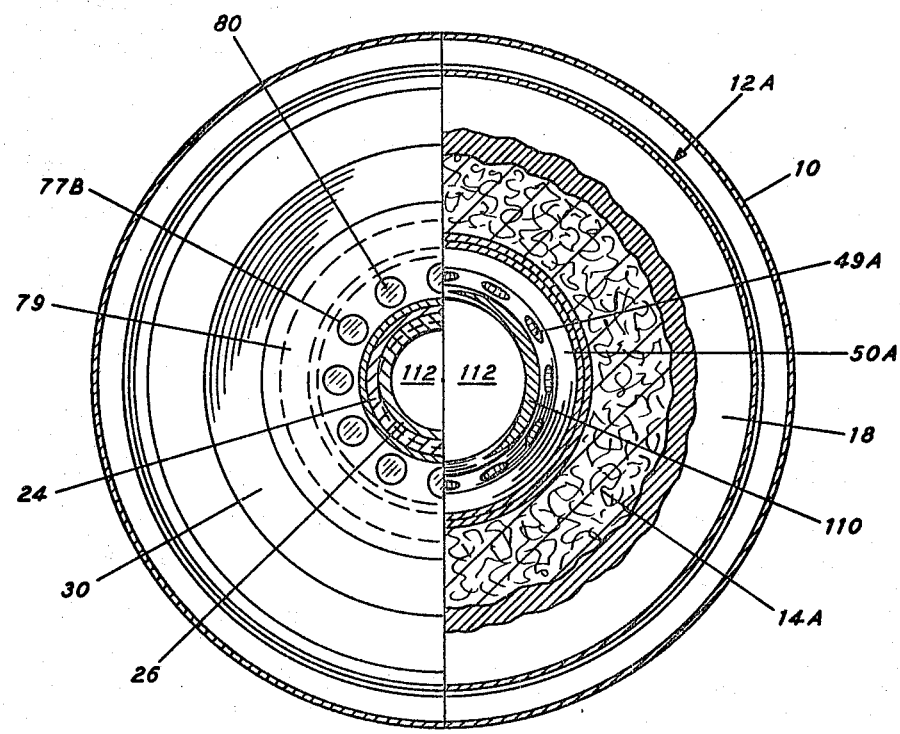

FIGURE 9 is a cross-sectional plan view, taken in the direction of line 9—9 in FIGURE 7.

Figure 1:
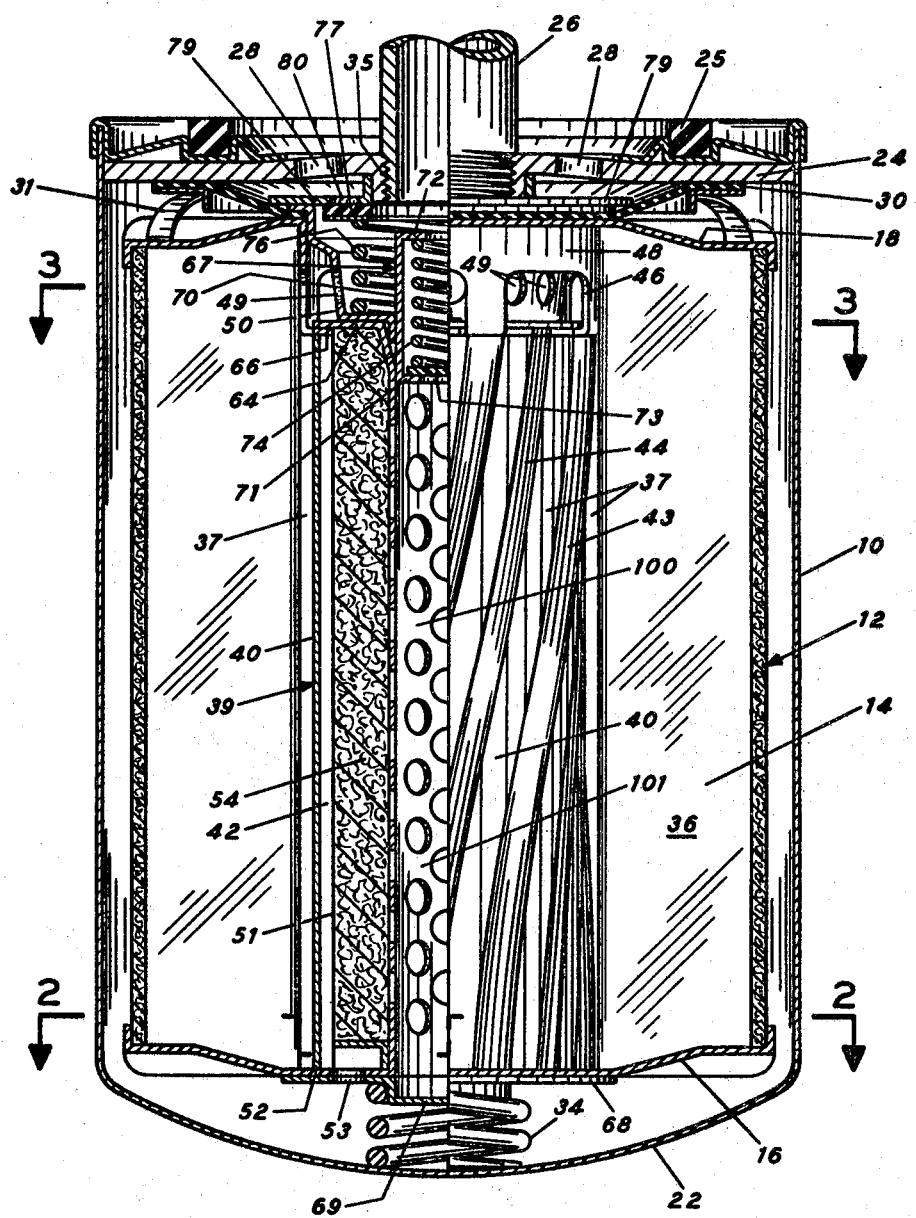
FIGURE 1 is a vertical elevation view, partially in section, illustrating the internal construction of a spin-on type filter lubricating oil filter unit constructed in accordance with one embodiment of the present invention.
Figure 3:
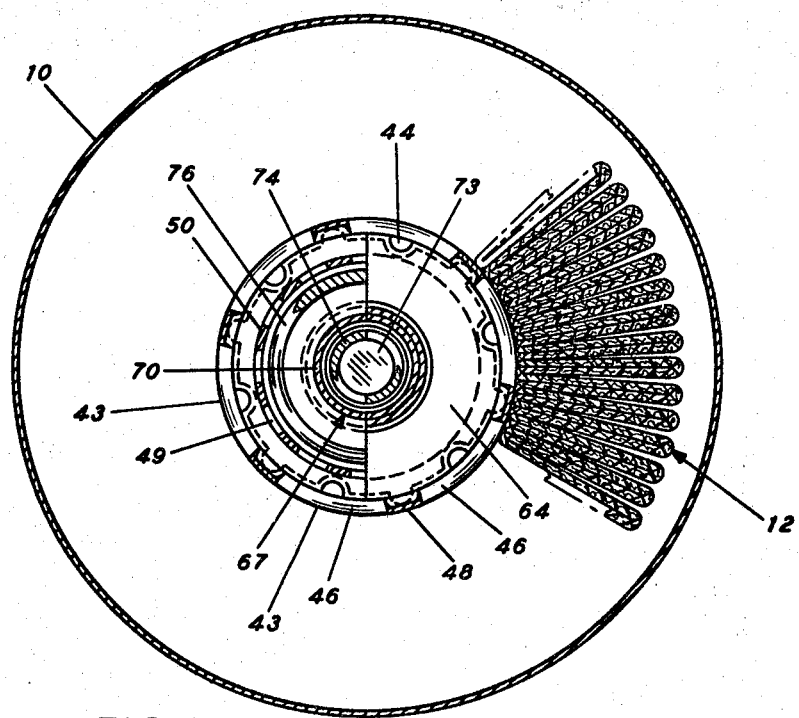
FIGURE 3 is a cross-sectional plan view taken in the direction of arrows 3—3 in FIGURE 1.

Referring now to the drawings and in particular to FIGURE 1, there is shown one arrangement of the present invention embodied in a spin-on type filter. As will be explained more fully hereinafter in connection with the detailed construction of this arrangement, a cup member 10 encloses an outer, or main annular, filter element 12 of conventional design, comprising either a continuous pleated paper, body 14 (or cotton fibers 14A as in FIGURE 4), sealed between a pair of end plates 16 and 18. These plates are spaced from the end wall 22 of the cup 10 and cover 24 so that oil enters cup 10 through ports 28 from the annular space between gasket ring 25 and discharge nipple 26. An antidrain-back valve, formed by rubber disk 30, and held in place by spring fingers 31 controls flow from ports 28 to the outer surface of main filter body 12. This annular filter body is held in position by spring 34 pressing against wall 22 of cup 10 and end plate 16 to hold end plate 18 in contact with cover 24.

As explained in my prior application, the interior or cylindrical space 37 within filter element 12 is conventionally hollow and serves only as a flow path for filtered oil coming through inner wall 36 of filter body 12 to reach discharge nozzle 26. However, as taught in my previous application this hollow cylindrical space may be utilized for extending and improving the operation of the over-all spin-on filter unit by positioning in space 37 a relatively coarse filter assembly designated generally as 39.

In the arrangement of FIGURE 1, coarse filter unit or assembly 39 comprises an impervious cylindrical shell 40 that includes a plurality of spiral channels 44 and protuberances 43. The area between protuberances 43 and channels 44, of course, provides the discharge flow path to nipple 26 in opening 35. This path is through holes 46 in mounting base 48 and passageways 49 in inner filter element mount or cage 50.

Figure 2:
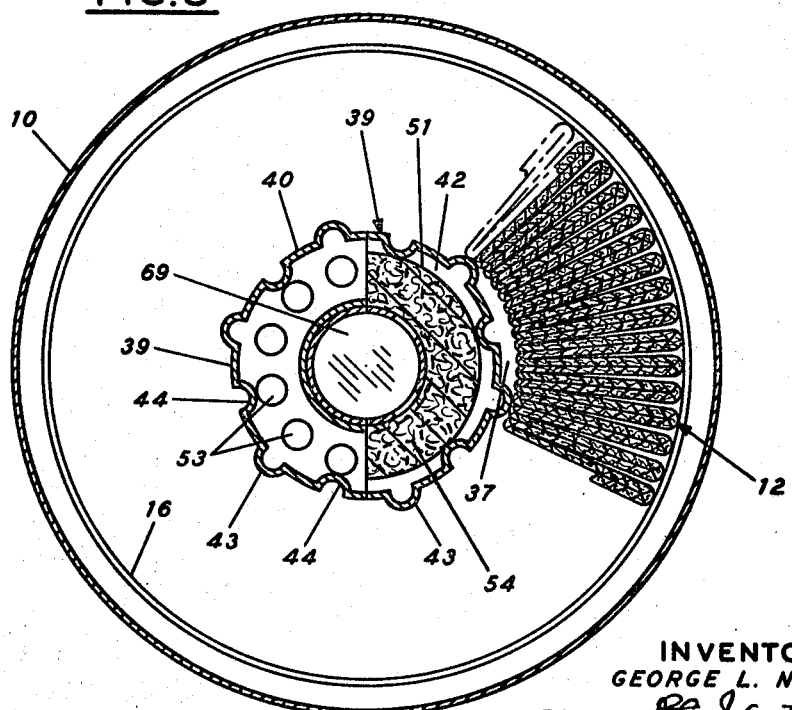
FIGURE 2 is a cross-sectional plan view taken in the direction of arrows 2—2 in FIGURE 1.

As shown in FIGURE 2, the protuberances 43 space the outer wall of shell 40 from the inner wall 36 of main filter 12 and increase lateral rigidity as oil flow through the main filter 12. End 52 of cylindrical shell 40 is sealed at the closed end of cup 10 to end plate 16 to isolate filtered oil passing through filter 12 from unfiltered oil admitted to space 42 through ports 53 in end plate 16. Unfiltered oil from ports 53 flows through annular space 42 between shell 40 and outer surface 51 of auxiliary filter body 54. The inlet end of filter body 54 at the closed end of cup 10 is sealed by plate member 68. Plate 68 includes a raised seat 69 for spring 34 to centralize the entire filter assembly within the cup 10. Filter body 54 is normally formed of sisal, rayon, fibrillated polypropylene, or other coarse filter material, that is substantially more permeable to oil flow than the fine filtered medium, such as paper or cotton, of filter body 12. It extends substantially coaxially of shell 40 and, as shown in FIGURE 2, may be spaced from the main wall of shell 40 by the channels 44.

The opposite end of cylindrical shell 40 is sealed to filter body 54 by cap 66 at the open end of the cup to prevent direct flow from annular passageway 42 to discharge. A dual valve arrangement is also located at the open end of the cup and includes a main bypass valve and an auxiliary bypass valve that control relative flow through coarse annular filter body 54 and fine filter body 12. Oil flow through body 54 is under control of auxiliary spring-loaded valve 67.

Auxiliary valve 67 comprises tube member 70 whose ends are turned over to form seats 71 and 72. Spring 74 loads disk 73 against a seat formed by end 71. The load applied by spring 74 to disk 73 is, of course, regulated to open at a pressure substantially less than that required for complete bypassing of the filter assembly from inlet to outlet through the main bypass valve adjacent to auxiliary valve 67.

The main bypass valve in this embodiment is a similar spring-and-disk arrangement comprising spring 76 and annular disk 77 also positioned within the cylindrical annular space 37 formed by the outer filter body 12. Spring 76 is placed between the in-folded base of mount 50 and a metal ring that contacts annular disk 77. It loads the disk 77 against auxiliary end plate 72 so as to seal ports 80 of auxiliary end plate 79 to oil flow. Auxiliary end plate 79 also supports the end of main filter element 12 and serves as a mounting base for end plate 18.

The magnitude of the biasing force of the spring 76 is normally set to open if obstructions within the filter elements raise the differential pressure above a preselected lever, say 8 lb. per sq. in. This is, of course, greater than the biasing force provided by spring 74 of auxiliary bypass valve 67 which is normally set to open at a lower differential pressure, say 6 lb. per sq. in. In accordance with one embodiment of my invention, springs 74 and 76 are constructed in a simplified form that not only provides desired biasing levels for operation of the valves but also reduces the space required to mount the springs within the filter unit. This space is then used to increase the length—and hence oil filtering capacity—of the auxiliary filter body 54.

As shown in FIGURE 1, spring 76 is constructed with a larger diameter than spring 74 and is coextensively positioned exterior of spring 74. This arrangement allows not only a large biasing force to be developed by spring 76, but also provides space for coaxially coextensively positioning spring 74 within the interior of spring 76. As a result, the space within the filter unit usually required for mounting the dual valve arrangement is reduced. This space is then used to increase the length of the inner filter body 54 to a greater degree than those of my previous designs, with a corresponding increase in oil filtering capacity.

As previously mentioned, the main bypass valve is normally set to open if obstructions within the filter element raise the differential pressure above 8 lb. per square inch. The lubricating oil then directly bypasses the filter through ports 80 and returns to the engine by nipple 26 without filtration. Such bypassing sometimes occurs even under normal operating conditions due to increased viscosity, as in the morning, or other cold starting conditions. Auxiliary bypass valve 67, as provided by my invention, controls flow through auxiliary body 54 so that under less extreme conditions of plugging there is filtering of at least the large particles from the oil, prior to returning it to the engine. In the present embodiment this flow is controlled on the down-filter, or discharge, side of auxiliary, or coarse, filter unit 39. By this arrangement, oil that has already passed through auxiliary filter body 54 applies pressure to auxiliary bypass valve 67. As is understood in hydraulic flow, this pressure, under no-flow conditions, is essentially the same as if the valve were placed ahead of (i.e., at the inlet to) the secondary, or auxiliary, filter as in the arrangement of FIGURE 4. This is because the static pressure on the discharge side of coarse filter element 54 equalizes with the pressure on the inlet side prior to flow.

I have also found that this location of the auxiliary valve operates equally well even after flow starts through the coarser filter element, since the pressure drop through such a coarse body, until severe plugging occurs, is not great. Furthermore, the pressure required to open auxiliary valve 67 initially is frequently higher than that required to hold it open after flow starts. This is believed to be due to the increase in cross-sectional area of the disk 73 exposed to pressure effects after flow begins. It will be noted that the total area against which the static fluid pressure works is somewhat smaller than the valve area after disk 73 slightly opens, so that under full flow conditions fluid pressure acts over the whole area of disk 73.

A particular advantage of the present arrangement is that auxiliary filter body 54 is substantially coextensive in length with main filter body 12 to a greater degree than my previous designs and greatly improves the surface area to volume ratio—hence oil filtering capacity—for the entire filter unit.

Reference is now made to the arrangement of FIGURES 4, 5 and 6. These figures show an alternate arrangement of the bypass valves for the coarse and fine filter bodies. In this arrangement cylindrical shell 39A is sealed to end plate 16 by a flared portion 81. The other end of shell 39A is sealed to filter body 54, and that end, in turn, mounts on flange 50A, having ports 49A, to pass oil filtered through the main filter body 14A to discharge nipple 26.

As further distinguished from the embodiment of FIGURE 1, the dual valve arrangement is at the closed or bottom end of cup 10 and comprises a pair of concentric valves supported by head plate 68A. The main bypass valve in this embodiment comprises tube 90, closed at its ends 91 and 92 to contain spring 93. A valve disk 94 is normally biased closed by spring 93. This valve is set for the main bypass pressure differential, say, again, 8 lb. per square inch. The auxiliary bypass valve 95 permits flow from cup 10 into annular space 42 between shell 39A and thence to filter body 54. It includes spring 96 and annular valve seat 97, all positioned within mounting base 98. Mounting member 98 includes ports 99 that permit flow from flapper valve 97 through ports 53A to reach annular space 42.

In this embodiment of my invention, the spring of the main bypass valve is seen to be positioned at a new location relative to the auxiliary bypass valve. As shown in FIGURE 4, main bypass spring 93 is positioned interior of the auxiliary spring 96, instead of exterior thereof as shown in the embodiment of FIGURE 1. Sufficient biasing force is developed by the characteristics of spring 93 over that shown in the embodiment of FIGURE 1. The springs are coaxial of each other and are coextensive over a major portion of their respective lengths. As a result, the dual valve arrangement occupies minimum space within the filter unit. Accordingly, the length of the inner coarse filter 54 can be increased to a greater degree than my previous designs, as illustrated in my aforementioned patent, with a corresponding increase in oil filtering capacity.

From the foregoing description, it will be apparent that the internal cylindrical space 37 within main filter body 12 has been more efficiently used and fewer parts used to construct a second, or auxiliary, filter unit to which flow is directed when the pressure differential across the main filter element is greater than a preselected value, say 6 lb. per square inch, but yet not sufficient to open the main bypass valve. Additionally, the valve construction has been simplified by placing both the main bypass valve and the auxiliary bypass valve at the same end of the spin-on filter unit. This arrangement simplifies construction of the insert element fitted within space 37 formed by inner wall 36 of main annular filter body 12 and in certain commercial spin-on filters permits my dual-valve and auxiliary filter assembly to be placed in space 37 with minor changes in present design.

As indicated above, the outer, or fine, filter body may be formed either by a mass of cotton fibers held between two perforated walls or screens, or by pleating paper.

While in the present two embodiments the coarse element 54 is shown supported on a central perforated-tube 100, it will be apparent that the center core 101 can be cast as a body so that it does not require metal tube 100.

If desired, a separate assembly comprising the dual valves and the auxiliary filter unit can be constructed as a separate component to be directly inserted in a conventional spin-on filter. For example, shell 40A, plate 79A, mounting collars 50A and 98 and plate 68A, as in FIGURE 4, can be formed as an insert unit containing the dual valve assemblies along with filter body 54. In FIGURE 1, this assembly comprises shell 40, plate 68, body 54, valve 70, mount 50 and plate 79.

A further simplified structure of the dual valve assembly is shown in FIGURES 7, 8 and 9. In this embodiment, a single spring, acting against the dual valve seats, replaces the pairs of springs 76 and 74 in FIGURE 1 or springs 96 and 93 in FIGURE 4 and applies equal bias force to the dual valves. In this embodiment the areas of the valve areas exposed to oil under pressure are selected to establish the desired pressure differentials between the main and auxiliary valves. It will be apparent that the arrangement reduces the total number of parts and the cost of the dual filter assembly without sacrifice in the function of either valve.

With specific reference to FIGURE 7, it will be seen that in general the embodiment is similar to FIGURE 4 except that the dual valves are positioned at the inlet-outlet end of the filter case end and that the same principle of controlling flow of fluid through the dual filter elements 14A and 54B is similar to the arrangement of FIGURE 1. However, as distinguished from FIGURE 1, only a single spring designated as 110 seats the first or auxiliary valve 114 and the main bypass valve 77A. Both valves 114 and 77A include pliant valve seating disks 114A and 77B located at the ends of spring 110. Valve disk 114A contacts, through a circular movable backing plate 112, the lower end of spring 110 and closes off flow through the auxiliary filtering element 54B until such time as the pressure differential in cup 10 exceeds a predetermined level. At such level, valve 114 opens by releasing valve disk 114A from sealing contact with valve casing 50A to allow flow through coarse filter 54B. As shown, the seat for valve 114 is the lower lip 116 of valve casing 50A, leaving an opening 118 through which oil flow occurs after valve 114 has opened. Similarly, valve disk 77B is seated and retained in sealing contact about bypass openings 80 in bypass plate 79 at the upper end of spring 110 by the same closure bias force acting on valve disk 114A. For valve 77A the bias force acts through backing plate 122. Valve 77A opens when a second and higher pressure differential than the previously mentioned pressure level is exceeded to directly couple the filter inlet to its outlet through openings 80. It is apparent that the opening 120 formed in annular plate 122 provides free communication for oil after it is filtered either through primary element 14A or auxiliary element 54B.

It will be apparent that the respective areas of the pliant movable valve disks 114A and 77B exposed to oil pressure when such disks are placed in their closed sealed positions will be proportioned to the strength of spring 110 to achieve the desired differential pressure operation wherein valve 114 will open at a predetermined first pressure differential, say, 4 to 6 pounds, and valve 77A will operate at a higher pressure differential, say, 8 pounds per square inch. The operation of the assembly will be seen to reduce the number of parts without eliminating the function of either valve.

Obviously, the arrangement of FIGURE 7 can be reversed so that the dual valve in a single body is at closed end 22 rather than at the open end of cup 10. In such an arrangement, the operation is similar to that shown in FIGURE 4, with the exception that valve 77A controls flow to annular space 42 around the outside of the coarser element 54B and the internal or inner valve 114 controls the bypass flow so that fluid completely bypasses from inlet to outlet through tube 100A. Accordingly, in this arrangement, valve 77A is set for operation at the lower pressure level of the system while valve 114 is set for operating at the higher system pressure.

While several embodiments of the present invention have been illustrated, various modifications and changes may be made in the exact structure without departing from the inventive concept. All such changes coming within the scope of the following claims are intended to be included.

I claim:
1. In a spin-on type engine lubricating oil filter unit comprising
   (a) a cup member adapted to be sealed to
      (i) a concentrically arranged annular supply chamber and
      (ii) a central discharge connection to an engine,

(b) a primary annular filter element having a permeable cylindrical wall formed of a relatively fine filtering medium sealed between (c) a pair of end plates, said end plates being spaced axially within said cup member to permit lubricating oil entering said cup to flow radially inwardly from said cup through said permeable cylindrical wall into (d) a hollow cylindrical space, said cylindrical space being connected directly to the central discharge connection in the open end of said cup member, (e) means forming a first bypass passageway through one of said end plates to permit lubricating oil to be returned from said cup directly to said central discharge connection without requiring passage through said permeable cylindrical wall, the improvement in an auxiliary annular filter element adapted to be received in the hollow cylindrical space of said primary filter element of said spin-on type engine lubricating oil filter unit comprising (1) an impervious cylindrical shell adapted to be spaced radially inwardly from the inner surface of the permeable wall of said primary annular filter element of said filter unit to form a first annular discharge flow path for oil passing through said main filter element, (2) one end of said cylindrical shell being sealed to one of said end plates of said primary annular filter element to confine fluid flow from said primary filter element to said central discharge connection through said first annular flow path within the center of said cylindrical wall, (3) an auxiliary filter body of a relatively coarser filtering medium than said primary annular element and extending axially within said impervious cylindrical shell and radially spaced inwardly therefrom to form a second flow path, (4) means forming a second passageway through the end plate sealed to said impervious cylindrical shell to permit oil to flow from said cup through said second flow path to said auxiliary filter body, (5) means sealing the opposite end of said impervious cylindrical shell to the corresponding end of said auxiliary filter body, (6) central discharge means connecting the outlet side of said auxiliary filter body to the same central discharge outlet for said primary annular filter element, and (7) dual valve means positioned at one end of said cylindrical hollow space for selectively controlling flow through said first bypass passageway and said second flow path between said cylindrical shell and said coarse filter body to said connecting means, said dual valve means including
  (i) main bypass valve means and
  (ii) auxiliary valve means positioned at one end of said auxiliary filter body, (8) said main bypass and auxiliary valve means including movable valve means and valve biasing means operatively connected to said movable means, said valve biasing means adapted to be supported at said one end of said auxiliary filter body so as to reduce the space required to mount said main and said auxiliary valve means within said filter unit, said main bypass valve controlling flow of oil through said first bypass passageway when a predetermined pressure differential exists between lubricating oil in said cup and said discharge connection, said pressure differential being due to oil viscosity effects or substantial plugging of said fine filter medium, said auxiliary valve means selectively controlling flow through said second annular flow path between said cylindrical shell and said coarse filter body to said connecting means, said auxiliary valve means being operable at a pressure less than that required for the main bypass valve to operate to return liquid from said cup to said discharge connection of said filter unit.

2. Apparatus in accordance with claim 1 wherein said main bypass valve means and said auxiliary valve means are positioned at the closed end of said cup member of said spin-on type filter unit, said auxiliary valve means adapted to control flow from said cup member through said second passageway means in said end plate into said second annular flow path between said cylindrical shell and said auxiliary annular filter body.

3. Apparatus in accordance with claim 1 wherein said main bypass valve means and said auxiliary valve means are positioned at the open end of said cup member of said spin-on type filter unit, said auxiliary valve means being positioned in said discharge means at the center of said auxiliary annular filter body to control passage of oil out of said auxiliary annular filter body to said discharge means.

4. A dual valve and auxiliary filter assembly adapted to be inserted in the central cylindrical space formed by an annular filter body enclosed in a full-flow spin-on type, internal combustion engine lubricating oil filter unit, said unit being connectible in a lubricating oil circulation system that supplies unfiltered lubricant to the casing for said unit through an annular inlet passage and returns filtered lubricant to a central discharge conduit, said assembly comprising (a) a pair of valve members at one end of said assembly and adapted to be supported by one of the end walls sealed to the primary annular filter body of said filter unit, each of said valve members including a disk member and a valve seat, at least one of said valve seats forming a part of a closure plate for the open central portion of said primary annular filter body, said pair of valve members also including spring means for urging said disk members against said valve seats, the area of said disk members and said spring means being selected to establish a pressure differential for operation of said valves in response to two different pressure conditions, (b) a cylindrical shell member radially spaced inwardly from the inner wall of said primary filter body, and (c) an auxiliary filter body radially spaced inwardly from said cylindrical shell, one end of said auxiliary filter body being in direct communication with the central discharge conduit for said filter unit and the opposite end being connected to the interior of the housing for said filter unit to selectively flow unfiltered oil therethrough from said exterior surface adjacent to said cylindrical shell toward the center of said auxiliary filter body, said spring means of said pair of valve members adapted to be supported at said one end of said auxiliary filter body so as to reduce the space required to mount said pair of valves within said oil filter unit.

5. An assembly in accordance with claim 4 in which said spring means is a single coil spring and the area of each valve of said dual valve exposed to fluid under pressure is proportional to the operating pressure differential desired across said valve.

6. In a spin-on type engine lubricating oil filter unit comprising a cup member adapted to be sealed to a concentrically arranged annular supply chamber and to a central discharge outlet to an engine, a primary annular filter element having a permeable cylindrical wall formed of a relatively fine filtering medium sealed between a pair of end plates, said end plates being spaced axially within said cup member to permit lubricating oil entering said cup to flow radially inwardly from said cup through said permeable cylindrical wall, said wall being connected directly to said central discharge outlet in the open end of said cup member, means to selectively permit lubricating oil to be returned from said cup through one of said end plates directly to said central discharge outlet without requiring passage through said permeable cylindrical wall when a first predetermined pressure differential exists between lubricating oil in said cup and said discharge outlet, said pressure differential being due to oil viscosity effects or substantial plugging of said fine filtering medium, the improvement in an auxiliary annular filter element adapted to be received in the hollow cylindrical space of said primary filter element of said spin-on type engine lubricating oil filter unit comprising (a) an impervious cylindrical shell adapted to be retained within such hollow cylindrical space of said primary filter element spaced radially inwardly from the inner surface of the permeable wall of said primary annular filter element of said filter unit to form an annular discharge flow path for filtered oil passing through said main filter element to said central discharge outlet, (b) an auxiliary annular filter body of a relatively coarser filter medium than said primary annular element adapted to be retained within and coaxially of said impervious cylindrical shell and radially spaced inwardly therefrom to form an inlet annular flow path so as to permit unfiltered oil to pass radially inward and through said auxiliary filter body toward the geometric center of said filter unit when a second predetermined pressure differential exists between said oil in said cup and said discharge outlet, (c) a perforated discharge cylinder having a side wall in contact with the interior surface of said auxiliary filter body and a central chamber in direct fluid contact with said central discharge outlet, (d) dual valve means for selectively controlling and directing oil flow through said filter unit, including
(i) a cage member,
(ii) a main bypass valve means, and
(iii) an auxiliary valve means,
positioned at an end of said auxiliary filter body within said cylindrical hollow space, said main bypass valve means and auxiliary valve means including movable valve means and valve biasing means operatively connected to said movable means, said biasing means adapted to be supported within said cage member at said end of said auxiliary filter body so as to reduce space required to mount said main bypass and auxiliary bypass valve means within said filter unit, said cage member including a wall having a series of openings therethrough and defining a central cavity having at least a portion in direct fluid contact with said discharge outlet of said filter unit, said main bypass valve means adapted to permit oil flow from said cup member into at least said portion of central cavity of said cage member and then directly to said discharge outlet of said filter unit, said permitted flow occurring when said first predetermined pressure differential exists between oil in said cup member and in said discharge outlet due to oil viscosity effects or substantial plugging of said fine filter and coarse filtering media, said auxiliary valve means being adapted to permit unfiltered oil to pass from said cup member through said cage member whereby said auxiliary annular filter body is open to oil flow, said permitted oil flow through said auxiliary filter body occurring when said second predetermined pressure differential exists between oil in said cup member and said discharge outlet, said first pressure differential for operation of said main bypass valve being greater than said second pressure differential for operation of said auxiliary bypass valve.

7. The improvement in accordance with claim 6 in which said dual valve and fluid directing means also includes a passageway through said end plate positioned at the closed end of said cup member adapted to directly connect unfiltered oil at said cup member to said auxiliary filter body through said annular inlet flow path, said cage member and said main and auxiliary bypass valve means being positioned adjacent to the open end of said cup member between said end plate and said discharge outlet whereby selective control of oil flow is achieved through auxiliary filter body at the discharge side of said body.

8. The improvement in accordance with claim 6 in which said dual valve and fluid directing means includes a central aperture through said end plate positioned adjacent to the closed end of said cup, said cage member and said main and auxiliary valve means being positioned at said aperture whereby selective control of oil flow is achieved through said auxiliary filter body at the inlet side of said auxiliary filter body.

9. The improvement of claim 6 in which said biasing means of said main and said auxiliary bypass valve means includes first and second springs of unequal diameters adapted to operatively attach to respective valve movable means of said main and said auxiliary valve means, said first and second springs being mounted coaxially of and coextensively with each other so as to reduce space required to mount said springs within said filter unit.

10. The improvement of claim 6 in which said biasing means of said main and auxiliary bypass valve means includes a single spring mounted between respective movable means of said main and auxiliary valve means, said single spring adapted to place each of said movable means in sealing contact with selected openings of said cage member, the area of said selected seal openings being proportioned so that the area of said valve means exposed to fluid pressure provides the desired pressure differentials across each of said valve means so as to selectively open each of said valve means at different pressure differentials.

11. The improvement of claim 6 in which said cylindrical shell includes a series of radial protuberances extending over at least a portion of the longitudinal portion thereof, said protuberances being adapted to contact at least said main filter element so as to increase lateral rigidity of said shell and main filter assembly.

References Cited
UNITED STATES PATENTS

| | | | |
|---|---|---|---|
| 3,216,571 | 11/1965 | Whiting et al. | 210—132 X |
| 3,268,077 | 8/1966 | Ball | 210—132 X |
| 3,269,541 | 8/1966 | Neely | 210—132 |
| 3,283,902 | 11/1966 | Farris et al. | 210—132 X |

REUBEN FRIEDMAN, *Primary Examiner.*

F. SPEAR, *Assistant Examiner.*